United States Patent
Li et al.

(10) Patent No.: US 11,812,399 B2
(45) Date of Patent: Nov. 7, 2023

(54) COMMUNICATION METHOD AND COMMUNICATION APPARATUS

(71) Applicant: HUAWEI TECHNOLOGIES CO., LTD., Guangdong (CN)

(72) Inventors: Yunbo Li, Shenzhen (CN); Ming Gan, Shenzhen (CN); Yuchen Guo, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/940,609

(22) Filed: Sep. 8, 2022

(65) Prior Publication Data
US 2023/0007609 A1  Jan. 5, 2023

Related U.S. Application Data

(63) Continuation of application No. PCT/CN2021/079909, filed on Mar. 10, 2021.

(30) Foreign Application Priority Data

Mar. 11, 2020 (CN) .......................... 202010167728.9

(51) Int. Cl.
*H04W 72/12* (2023.01)
*H04W 56/00* (2009.01)
*H04L 5/00* (2006.01)

(52) U.S. Cl.
CPC ....... *H04W 56/0055* (2013.01); *H04L 5/0044* (2013.01); *H04W 72/12* (2013.01)

(58) Field of Classification Search
CPC ........ G01S 13/765; G01S 5/0205; G01S 5/10; G01S 1/20; G01S 11/06; G01S 13/75;
(Continued)

(56) References Cited

U.S. PATENT DOCUMENTS

| 9,295,074 B2 * | 3/2016 | Zhu .................... H04W 72/121 |
| 2014/0071874 A1 * | 3/2014 | Li .......................... H04L 1/1887 370/311 |

(Continued)

FOREIGN PATENT DOCUMENTS

| CA | 2946926 A1 | 1/2017 |
| CN | 103037531 A | 4/2013 |

(Continued)

OTHER PUBLICATIONS

IEEE Std 802.11-2016, "IEEE Standard for Information Technology—Telecommunications and Information Exchange between Systems Local and Metropolitan Area Networks—Specific Requirements, Part 11: Wireless LAN Medium Access Control (MAC) and Physical Layer (PHY) Specifications," Dec. 7, 2016, 3534 pages.

(Continued)

*Primary Examiner* — Nathan S Taylor
(74) *Attorney, Agent, or Firm* — Fish & Richardson P.C.

(57) ABSTRACT

This application provides a communication method and a communication apparatus. One example method includes: A sending device sends a first physical layer protocol data unit PPDU over a first link, where the first PPDU carries a trigger frame. The sending device sends a second PPDU over a second link, where an end time of sending the second PPDU is not earlier than a first time and not later than a second time, the first time is related to an end time of sending the first PPDU and a state turnaround time in a short interframe space SIFS time, and the second time is related to the end time of sending the first PPDU and the SIFS time.

20 Claims, 5 Drawing Sheets

(58) Field of Classification Search
CPC .. G01S 13/76; G01S 5/02; G01S 5/06; H04W 56/009; H04W 64/003; H04W 64/006; H04W 56/00; H04W 64/00; H04W 24/02; H04W 24/10; H04W 4/02; H04W 4/33; H04W 88/00; H04W 74/08; H04W 74/0808; H04W 74/0825; H04W 76/15; H04W 84/12; H04L 43/106; H04B 17/27
See application file for complete search history.

(56) References Cited

U.S. PATENT DOCUMENTS

| | | | | |
|---|---|---|---|---|
| 2015/0085775 | A1* | 3/2015 | Choi | H04W 74/0808 370/329 |
| 2015/0382333 | A1* | 12/2015 | Seok | H04L 1/188 370/338 |
| 2016/0330726 | A1 | 11/2016 | Li et al. | |
| 2018/0006866 | A1 | 1/2018 | Trainin et al. | |
| 2018/0146426 | A1 | 5/2018 | Park | |
| 2020/0029324 | A1 | 1/2020 | Nezou et al. | |
| 2021/0168712 | A1* | 6/2021 | Cherian | H04W 52/0216 |
| 2021/0282119 | A1* | 9/2021 | Asterjadhi | H04W 88/08 |
| 2021/0282161 | A1* | 9/2021 | Sun | H04W 72/1205 |
| 2022/0053441 | A1* | 2/2022 | Seok | H04W 76/15 |

FOREIGN PATENT DOCUMENTS

| | | |
|---|---|---|
| CN | 106851848 A | 6/2017 |
| CN | 106941731 A | 7/2017 |
| CN | 109756978 A | 5/2019 |
| CN | 110661608 A | 1/2020 |
| WO | 2016179307 A1 | 11/2016 |
| WO | 2018074871 A1 | 4/2018 |
| WO | 2019164365 A1 | 8/2019 |

OTHER PUBLICATIONS

Intel Corporation, Channel access mechanism for NR-Unlicensed, 3GPP TSG RAN WG1 Meeting #98bis, R1-1910640, Chongqing, China, Oct. 14-20, 2019, 29 pages.
PCT International Search Report and Written Opinion issued in International Application No. PCT/CN2021/079909 dated May 31, 2021, 15 pages (with English translation).
Seok et al., "Synchronous Multi-Link Transmission," IEEE 802.11-19/1305r0, Jan. 2020, 12 pages.
Li et al., "Channel Access Design for Synchronized Multi-Links," IEEE 802.11-19/1548r4, Sep. 7, 2019, 12 pages.
Extended European Search Report in European Appln No. 21768190.7, dated Jul. 18, 2023, 7 pages.
Li et al., "Channel Access Design for Synchronized Multi-Links," IEEE 802.11-19/1548r1, Sep. 2019, 11 pages.
Ho et al., "MLA: Support for Constrained Devices," IEEE 802.11-20/0026r0, Jan. 2020, 10 pages.
Fischer, "MLO Synchronous Transmission," IEEE 802.11-20/0081r0, Jan. 2020, 59 pages.
Office Action in Japanese Appln. No. 2022-554704, dated Jul. 18, 2023, 5 pages (with English translation).

* cited by examiner

COMMUNICATION METHOD AND COMMUNICATION APPARATUS

CROSS-REFERENCE TO RELATED APPLICATIONS

This application is a continuation of International Application No. PCT/CN2021/079909, filed on Mar. 10, 2021, which claims priority to Chinese Patent Application No. 202010167728.9, filed on Mar. 11, 2020. The disclosures of the aforementioned applications are hereby incorporated by reference in their entireties.

TECHNICAL FIELD

This application relates to the communication field, and more specifically, to a communication method and a communication apparatus.

BACKGROUND

Figure 1:
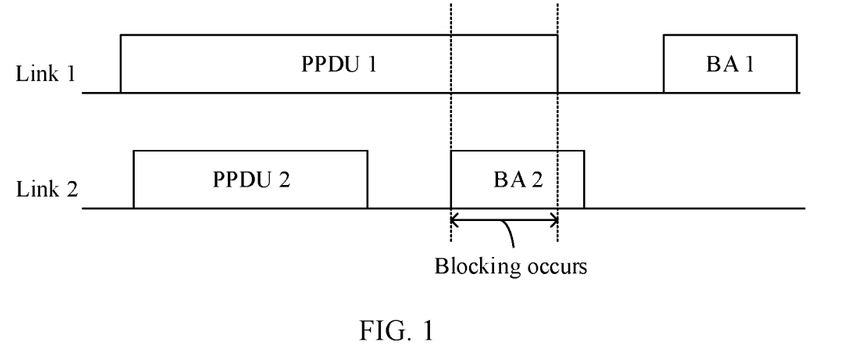
FIG. 1 is an example diagram of an STR constraint system.

To achieve a technical objective of extremely high throughput, the next-generation standard IEEE 802.11be uses multi-link (multi-link, ML) as a key technology. A wireless local area network (wireless local area network, WLAN) device that supports the next-generation IEEE 802.11 standard has a multi-band (multi-band) transmitting and receiving capability. If a frequency spacing between multiple frequency bands supported by the WLAN device that supports the next-generation standard is small, sending a signal on one frequency band affects receiving a signal on another frequency band. Therefore, the entity cannot independently perform transmitting and receiving operations on multiple frequency bands, so as to avoid interference. For example, for a simultaneous transmit and receive (simultaneous transmit and receive, STR) constraint system shown in FIG. 1, blocking occurs when a block acknowledgment (block ack, BA) 2 and a physical layer protocol data unit (PHY protocol data unit, PPDU) 1 overlap in time. To be specific, energy leaked on a link 1 during transmission of the BA 2 over a link 2 blocks receiving of the PPDU 1 over the link 1.

A solution in the conventional technology for the STR constraint system has a limitation, and is only applicable to a scenario in which none of PPDUs sent by a sending device carries a trigger frame. However, the conventional technology is not applicable to a scenario in which the sending device sends a PPDU carrying a trigger frame.

SUMMARY

In view of this, this application provides a communication method and a communication apparatus. When a PPDU sent by a sending device carries a trigger frame, it can be ensured that a receiving device successfully implements carrier sensing before returning a TB PPDU.

According to a first aspect, a communication method is provided. The method includes: A sending device sends a first physical layer protocol data unit (PPDU) over a first link, where the first PPDU carries a trigger frame. The sending device sends a second PPDU over a second link, where an end time of sending the second PPDU is not earlier than a first time and not later than a second time, the first time is related to an end time of sending the first PPDU and a state turnaround time in a short interframe space (SIFS) time, and the second time is related to the end time of sending the first PPDU and the SIFS time. Therefore, in this embodiment of this application, when a PPDU carrying a trigger frame is sent over only one of two links, a constraint is put on an end time of the PPDU, so that a receiving device can successfully implement carrier sensing before returning a TB PPDU.

The SIFS time may be understood as: The receiving device returns the TB PPDU after the SIFS time. Before returning the TB PPDU, the receiving device needs to detect, in an energy detection manner within the SIFS time before sending the TB PPDU, whether a channel is in an idle state.

In a possible implementation, the first time satisfies the following formula: $M=T_1-T_2$; and the second time satisfies the following formula: $N=T_1+T_4$. M represents the first time, $T_1$ represents the end time of the first PPDU, $T_2$ represents the state turnaround time, N represents the second time, and $T_4$ represents the SIFS time. A formula that the first time and the second time satisfy may be introduced herein, to help determine a condition that the end time of the second PPDU needs to satisfy.

In a possible implementation, the first time is further related to a slot time, and the second time is further related to the slot time. In other words, a slot time factor may further be considered for determining the first time and the second time, so that the implementation is applicable to a scenario in which the slot time exists.

In a possible implementation, the first time satisfies the following formula: $M=T_1-(T_2-x\times T_3)$ or $M=T_1-\text{Max}(0,T_2-x\times T_3)$; and the second time satisfies the following formula: $N=T_1+(T_4-y\times T_3)$. M represents the first time, $T_1$ represents the end time of the first PPDU, $T_2$ represents the state turnaround time, X represents a first delay coefficient, $T_3$ represents the slot time, Max represents obtaining a maximum value, N represents the second time, $T_4$ represents the SIFS time, and y represents a second delay coefficient. Herein, in a scenario in which the slot time is considered, a formula that the first time and the second time satisfy may be introduced, to help determine a condition that the end time of the second PPDU needs to satisfy.

In a possible implementation, the first time is further related to an air propagation time, and the second time is further related to the air propagation time. In other words, a air propagation factor may further be considered for determining the first time and the second time, so that the implementation is applicable to a scenario in which the air propagation time exists.

In a possible implementation, the first time satisfies the following formula: $M=T_1-(T_2-x\times(T_3-A))$ or $M=T_1-\text{Max}(0,T_2-x\times(T_3-A))$; and the second time satisfies the following formula: $N=T_1+(T_4-y\times(T_3-A))$. M represents the first time, $T_1$ represents the end time of the first PPDU, $T_2$ represents the state turnaround time, $T_3$ represents the slot time, X represents the first delay coefficient, Max represents obtaining a maximum value, N represents the second time, $T_4$ represents the SIFS time, A represents the air propagation time, and y represents the second delay coefficient. Herein, in a scenario in which the slot time and the air propagation time are considered, a formula that the first time and the second time satisfy may be introduced, to help determine a condition that the end time of the second PPDU needs to satisfy.

In a possible implementation, the method further includes: The sending device receives the state turnaround time from the receiving device. Herein, the sending device receives the state turnaround time. This helps determine a constraint on the end time of the second PPDU.

According to a second aspect, a communication method is provided. The method includes: A receiving device receives a first physical layer protocol data unit (PPDU) over a first link, where the first PPDU carries a trigger frame. The receiving device receives a second PPDU over a second link, where an end time of sending the second PPDU is not earlier than a first time and not later than a second time, the first time is related to an end time of sending the first PPDU and a state turnaround time in a short interframe space (SIFS) time, and the second time is related to the end time of sending the first PPDU and the SIFS time. Therefore, in this embodiment of this application, when a PPDU carrying a trigger frame is sent over only one of two links, a constraint is put on an end time of the PPDU, so that a receiving device can successfully implement carrier sensing before returning a TB PPDU.

Optionally, the method further includes: The receiving device sends the state turnaround time to a sending device. This helps the sending device determine a constraint on the end time of the second PPDU by using the state turnaround time.

According to a third aspect, a communication method is provided. The method includes: A sending device sends a first physical layer protocol data unit (PPDU) over a first link, where the first PPDU carries a first trigger frame. The sending device sends a second PPDU over a second link, where the second PPDU carries a second trigger frame. An absolute value of a time difference between an end time of sending the first PPDU and an end time of sending the second PPDU is less than or equal to a first duration, and the first duration is related to a state turnaround time in a short interframe space (SIFS) time. Therefore, when a PPDU carrying a trigger frame is sent over each of two links, the sending device puts a constraint on an absolute value of a time difference between end times of two PPDUs, to ensure that a receiving device successfully implements carrier sensing before returning a TB PPDU.

In a possible implementation, the first duration satisfies the following formula: $L=T_2$, where L represents the first duration, and $T_2$ represents the state turnaround time. A formula that the first duration satisfies may be introduced herein, to help determine a condition that the absolute value of the time difference between the end times of the two PPDUs needs to satisfy.

In a possible implementation, the first duration is further related to a slot time. In other words, a slot time factor may further be considered for determining the first duration, so that the implementation is applicable to a scenario in which the slot time exists.

In a possible implementation, the first duration satisfies the following formula: $L=T_2-X\times T_3$ or $L=Max(0,T_2-X\times T)$. L represents the first duration, $T_2$ represents the state turnaround time, X represents a first delay coefficient, $T_3$ represents the slot time, and Max represents obtaining a maximum value. Herein, in a scenario in which the slot time is considered, a formula that the first duration satisfies may be introduced, to help determine a condition that the absolute value of the time difference between the end times of the two PPDUs needs to satisfy.

In a possible implementation, the first duration is further related to an air propagation time. In other words, a slot time factor may further be considered for determining the first duration, so that the implementation is applicable to a scenario in which the air propagation time exists.

In a possible implementation, the first duration satisfies the following formula: $L=T_2-X\times(T_3-A)$, or $L=Max(0,T_2-X\times(T_3-A))$. L represents the first duration, $T_2$ represents the state turnaround time, X represents the first delay coefficient, $T_3$ represents the slot time, A represents the air propagation time, and Max represents obtaining a maximum value. Herein, in a scenario in which the slot time and the air propagation time are considered, a formula that the first duration satisfies may be introduced, to help determine a condition that the absolute value of the time difference between the end times of the two PPDUs needs to satisfy.

In a possible implementation, the method further includes: The sending device receives the state turnaround time from the receiving device. Herein, the sending device receives the state turnaround time. This helps determine a constraint condition of the absolute value of the time difference between the end time of the first PPDU and the end time of the second PPDU.

According to a fourth aspect, a communication method is provided. The method includes: A receiving device receives a first physical layer protocol data unit (PPDU) over a first link, where the first PPDU carries a first trigger frame, and sending, to a sending device after a SIFS time, a TB PPDU for the first PPDU. The receiving device receives a second PPDU over a second link, where the second PPDU carries a second trigger frame, and the receiving device sends a TB PPDU for the second PPDU to a sending device after the SIFS time. An absolute value of a time difference between an end time of the first PPDU and an end time of the second PPDU is less than or equal to first duration, and the first duration is related to a state turnaround time in the short interframe space (SIFS) time. Therefore, in this embodiment of this application, when a PPDU carrying a trigger frame is sent over each of two links, a constraint is put on an absolute value of a time difference between end times of two PPDUs, so that the receiving device can successfully implement carrier sensing before returning a TB PPDU.

Implementations of the first duration are the same as those of the third aspect. For details, refer to descriptions in the third aspect.

Optionally, the method further includes: The receiving device sends the state turnaround time to a sending device, to help the sending device determine a constraint on the absolute value of the time difference between the end time of the first PPDU and the end time of the second PPDU by using the state turnaround time.

According to a fifth aspect, a communication apparatus is provided. The apparatus includes a module configured to perform the method according to any one of the first aspect or the possible implementations of the first aspect, a module configured to perform the method according to any one of the second aspect or the possible implementations of the second aspect, a module configured to perform the method according to any one of the third aspect or the possible implementations of the third aspect, or a module configured to perform the method according to any one of the fourth aspect or the possible implementations of the fourth aspect.

According to a sixth aspect, a communication apparatus is provided. The communication apparatus includes a processor. The processor is coupled to a memory, and may be configured to execute instructions in the memory, to implement the method according to any one of the first aspect, the third aspect, or the possible implementations of the first aspect or the third aspect. Optionally, the apparatus further includes the memory. Optionally, the apparatus further includes a communication interface, and the processor is coupled to the communication interface.

In an implementation, the apparatus is a sending device. When the apparatus is the sending device, the communication interface may be a transceiver or an input/output interface.

In another implementation, the apparatus is a chip configured in a sending device. When the apparatus is the chip configured in the sending device, the communication interface may be an input/output interface.

Optionally, the transceiver may be a transceiver circuit. Optionally, the input/output interface may be an input/output circuit.

According to a seventh aspect, a communication apparatus is provided. The communication apparatus includes a processor. The processor is coupled to a memory, and may be configured to execute instructions in the memory, to implement the method according to any one of the second aspect, the fourth aspect, or the possible implementations of the second aspect or the fourth aspect. Optionally, the apparatus further includes the memory. Optionally, the apparatus further includes a communication interface, and the processor is coupled to the communication interface.

In an implementation, the apparatus is a receiving device. When the apparatus is the receiving device, the communication interface may be a transceiver or an input/output interface.

In another implementation, the apparatus is a chip configured in a receiving device. When the apparatus is the chip configured in the receiving device, the communication interface may be an input/output interface.

Optionally, the transceiver may be a transceiver circuit. Optionally, the input/output interface may be an input/output circuit.

According to an eighth aspect, a processor is provided, and includes an input circuit, an output circuit, and a processing circuit. The processing circuit is configured to: receive a signal via the input circuit, and transmit a signal via the output circuit, so that the processor is enabled to perform the method according to any one of the first aspect to the fourth aspect and the possible implementations of the first aspect to the fourth aspect.

In a specific implementation process, the processor may be a chip, the input circuit may be an input pin, the output circuit may be an output pin, and the processing circuit may be a transistor, a gate circuit, a trigger, various logic circuits, or the like. An input signal received by the input circuit may be received and input by, for example, but not limited to, a receiver, a signal output by the output circuit may be output to, for example, but not limited to, a transmitter and transmitted by the transmitter, and the input circuit and the output circuit may be a same circuit, where the circuit is used as the input circuit and the output circuit at different times. Specific implementations of the processor and the circuits are not limited in the embodiments of this application.

According to a ninth aspect, an apparatus is provided. The apparatus includes a processor and a memory. The processor is configured to read instructions stored in the memory, receive a signal via a receiver, and transmit a signal via a transmitter, to perform the method according to any one of the first aspect to the fourth aspect and the possible implementations of the first aspect to the fourth aspect.

Optionally, there are one or more processors, and there are one or more memories.

Optionally, the memory may be integrated with the processor, or the memory and the processor are separately disposed.

In a specific implementation process, the memory may be a non-transitory (non-transitory) memory, for example, a read-only memory (read-only memory, ROM). The memory and the processor may be integrated on a same chip, or may be separately disposed on different chips. A type of the memory and a manner of disposing the memory and the processor are not limited in this embodiment of this application.

It should be understood that, a related data exchange process such as sending of indication information may be a process of outputting the indication information from the processor, and receiving of capability information may be a process of receiving the input capability information by the processor. Specifically, data output by the processor may be output to the transmitter, and input data received by the processor may be from the receiver. The transmitter and the receiver may be collectively referred to as a transceiver.

The apparatus in the ninth aspect may be a chip. The processor may be implemented by using hardware or software. When the processor is implemented by using hardware, the processor may be a logic circuit, an integrated circuit, or the like. When the processor is implemented by using software, the processor may be a general-purpose processor, and is implemented by reading software code stored in the memory. The memory may be integrated into the processor, or may exist independently outside the processor.

According to a tenth aspect, a computer-readable storage medium is provided. The computer-readable storage medium stores a computer program or instructions. When the computer program or the instructions are executed, the method according to any one of the first aspect to the fourth aspect and the possible implementations of the first aspect to the fourth aspect is implemented.

According to an eleventh aspect, a computer program product including instructions is provided. When the instructions are run, the method according to any one of the first aspect to the fourth aspect and the possible implementations of the first aspect to the fourth aspect is implemented.

According to a twelfth aspect, a communication chip is provided. The communication chip stores instructions. When the instructions are run on a computer device, the communication chip is enabled to perform the method according to any one of the first aspect or the possible implementations of the first aspect, or the communication chip is enabled to perform the method according to any one of the third aspect or the possible implementations of the third aspect.

According to a thirteenth aspect, a communication chip is provided. The communication chip stores instructions. When the instructions are run on a computer device, the communication chip is enabled to perform the method according to any one of the second aspect or the possible implementations of the second aspect, or the communication chip is enabled to perform the method according to any one of the fourth aspect or the possible implementations of the fourth aspect.

According to a fourteenth aspect, a communication system is provided. The communication system includes a sending device and a receiving device.

Optionally, the communication system further includes another device that communicates with the sending device and/or the receiving device.

DESCRIPTION OF EMBODIMENTS

The following describes technical solutions in this application with reference to the accompanying drawings.

The technical solutions in embodiments of this application may be used in various communication systems, for example, a long term evolution (long term evolution, LTE) system, an LTE frequency division duplex (frequency division duplex, FDD) system, and an LTE time division duplex (time division duplex, TDD), a Wi-Fi system, a wireless local area network (wireless local area network, WLAN), a worldwide interoperability for microwave access (worldwide interoperability for microwave access, WiMAX) communication system, a future fifth generation (5th generation, 5G) system, a new radio (new radio, NR), or a device to device (device to device, D2D) system.

In a communication system, if a device sends data to another device or receives data sent by another device, the another device receives the data sent by the data sending device, and/or sends the data to the data sending device.

The technical solutions provided in the embodiments of this application may be applied to wireless communication between communication devices. The wireless communication between the communication devices may include wireless communication between a network device and a terminal, wireless communication between network devices, and wireless communication between terminals. In the embodiments of this application, the term "wireless communication" may be referred to as "communication", and the term "communication" may also be described as "data transmission", "information transmission", or "transmission".

The terminal device may be a station (station, STA), user equipment, an access terminal, a subscriber unit, a subscriber station, a mobile station, a remote station, a remote terminal, a mobile device, a user terminal, a terminal, a wireless communication device, a user agent, or a user apparatus. The terminal device may further be a cellular phone, a cordless phone, a session initiation protocol (session initiation protocol, SIP) phone, a wireless local loop (wireless local loop, WLL) station, a personal digital assistant (personal digital assistant, PDA), a handheld device having a wireless communication function, a computing device, another processing device connected to a wireless modem, a vehicle-mounted device, a wearable device, a terminal device in a future 5G network, a terminal device in a future evolved public land mobile network (public land mobile network, PLMN), or the like. This is not limited in the embodiments of this application.

The network device may be a device configured to communicate with a terminal device, or may be referred to as a radio access network (radio access network, RAN) device, or the like. The network device includes but is not limited to: an access point (access point, AP), a next-generation NodeB (next generation nodeB, gNB) in 5G, an evolved NodeB (evolved nodeB, eNB), a baseband unit (baseband unit, BBU), a transmission reception point (transmitting and receiving point, TRP), a transmission point (transmitting point, TP), a relay station, and the like. The network device may alternatively be a radio controller or the like in a cloud radio access network (cloud radio access network, CRAN) scenario. In addition, the network device may be further responsible for functions on an air interface side, such as radio resource management, quality of service (quality of service, QoS) management, and data compression and encryption. The network device may support at least one wireless communication technology, such as LTE or NR.

In some deployments, the gNB may include a centralized unit (centralized unit, CU) and a distributed unit (distributed unit, DU). The gNB may further include an active antenna unit (active antenna unit, AAU). The CU implements some functions of the gNB, and the DU implements some functions of the gNB. For example, the CU is responsible for processing a non-real-time protocol and service, and implements functions of a radio resource control (radio resource control, RRC) layer and a packet data convergence protocol (packet data convergence protocol, PDCP) layer. The DU is responsible for processing a physical layer protocol and a real-time service, and implements functions of a radio link control (radio link control, RLC) layer, a media access control (media access control, MAC) layer, and a physical (physical, PHY) layer. The AAU implements some physical layer processing functions, radio frequency processing, and functions related to an active antenna. Information at the RRC layer eventually becomes information at the PHY layer, or is changed from information at the PHY layer. Therefore, in this architecture, higher layer signaling such as RRC layer signaling may also be considered as being sent by the DU or sent by the DU and the AAU. It may be understood that a network device may be a device including one or more of a CU node, a DU node, and an AAU node. In addition, the CU may be classified as a network device in a radio access network (radio access network, RAN), or the CU may be classified as a network device in a core network (core network, CN). This is not limited in this application.

In the embodiments of this application, the terminal device or the network device includes a hardware layer, an operating system layer running above the hardware layer, and an application layer running above the operating system layer. The hardware layer includes hardware such as a central processing unit (central processing unit, CPU), a memory management unit (memory management unit, MMU), and a memory (which is also referred to as a main memory). The operating system may be any one or more computer operating systems that implement service processing by using a process (process), for example, a Linux operating system, a Unix operating system, an Android operating system, an iOS operating system, or a Windows operating system. The application layer includes applications such as a browser, an address book, word processing software, and instant messaging software. In addition, a specific structure of an entity for performing a method provided in the embodiments of this application is not particularly limited in the embodiments of this application, provided that the entity can run a program that records code of the method provided in the embodiments of this application to perform communication according to the method provided in the embodiments of this application. For example, the entity for performing the method provided in the embodiments of this application may be a terminal device, a network device, or a functional module that is in a terminal device or a network device and that can invoke and execute the program.

In addition, each aspect or feature of this application may be implemented as a method, an apparatus or a product that uses standard programming and/or engineering technologies. The term "product" used in this application covers a computer program that can be accessed from any computer-readable component, carrier or medium. For example, the computer-readable medium may include but is not limited to: a magnetic storage component (for example, a hard disk, a floppy disk, or a magnetic tape), an optical disc (for example, a compact disc (compact disc, CD), a digital versatile disc (digital versatile disc, DVD)), a smart card, and a flash memory component (for example, an erasable programmable read-only memory (erasable programmable read-only memory, EPROM), a card, a stick, or a key drive). In addition, various storage media described in this specification may indicate one or more devices and/or other machine-readable media that are configured to store information. The term "machine-readable media" may include but is not limited to a wireless channel, and various other media that can store, include, and/or carry instructions and/or data.

Figure 2:
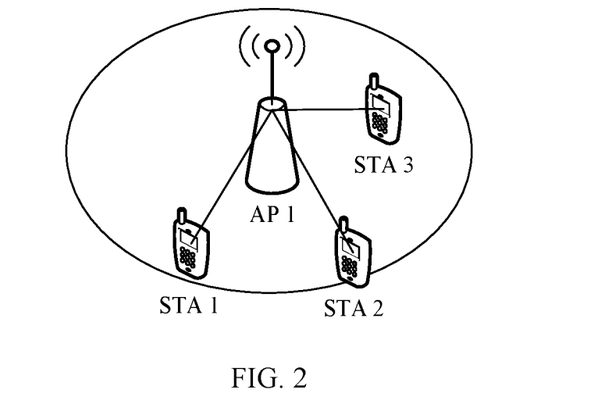
FIG. 2 is an example diagram of a scenario to which this application is applied.

This application is applicable to a communication system in which one node performs wireless communication with one or more nodes. The node may be an access point multi-link device (access point multi-link device, AP MLD), or may be a non-access point multi-link device (non-access point multi-link device, non-AP MLD). The wireless communication may be communication between one AP MLD and one or more non-AP MLDs/SLDs, or may be communication between one non-AP MLD and one or more AP MLDs, or may be communication between non-AP MLDs, or communication between AP MLDs. This is not limited in this application. FIG. 2 is an example diagram of a scenario to which this application is applied. As shown in FIG. 2, the scenario includes an AP 1, a STA 1, a STA 2, and a STA 3. Uplink and downlink communication can be performed between the AP and the STAs. It may be understood that, the three STAs in FIG. 2 may be three STAs in an MLD device, and the AP 1 may be an AP in the MLD. It may further be understood that a quantity of APs or STAs in FIG. 2 is not limited in this application, and an example in FIG. 2 is merely an example for description.

To achieve a technical objective of extremely high throughput, the next-generation standard IEEE 802.11be uses multi-link (multi-link, ML) as a key technology. A core idea is that a WLAN device that supports the next-generation IEEE 802.11 standard has a multi-band (multi-band) transmitting and receiving capability, so that a wider bandwidth can be used for data transmission. This improves throughput significantly. The multi-band includes but is not limited to a 2.4 GHz Wi-Fi frequency band, a 5 GHz Wi-Fi frequency band, and a 6 GHz Wi-Fi frequency band. Access and transmission performed on each frequency band are referred to as one link, so that access and transmission performed on multiple frequency bands are referred to as ML. There may also be multiple links on each frequency band, and the multiple links may form ML. For example, there may be multiple links on a 5 GHz Wi-Fi frequency band. In another example, there may be multiple links on a 6 GHz Wi-Fi frequency band. A next-generation IEEE 802.11 standard station device that simultaneously supports multiple links is referred to as a multi-link device (multi-link device, MLD) herein. For example, the MLD may include multiple STAs, and each STA may establish a link with a STA in another MLD for communication.

Figure 3:
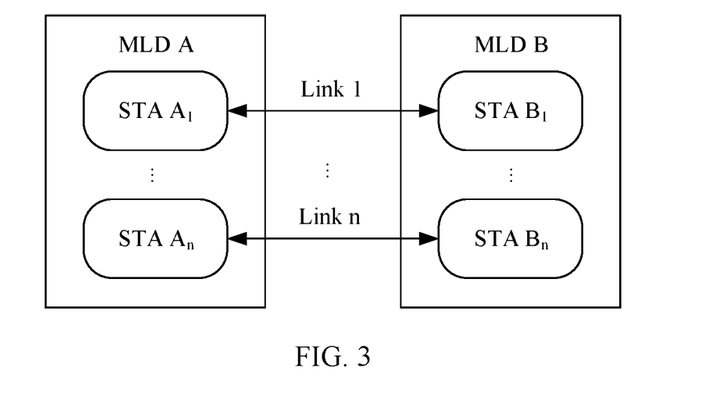
FIG. 3 is an example diagram of a system to which this application is applied.

FIG. 3 is an example diagram of a system to which this application is applied. As shown in FIG. 3, the system includes an MLD A and an MLD B. The MLD A includes n STAs. The MLD B includes n STAs. The MLD A and the MLD B may be sending and receiving devices for each other. For example, the MLD A is a sending device, and the MLD B is a receiving device. In another example, the MLD B is a sending device, and the MLD A is a receiving device. It may be understood that, in FIG. 3, an example in which the MLD includes multiple STAs is used for description. This does not constitute a limitation on the protection scope of the embodiments of this application. For example, the MLD may alternatively include multiple APs. In another example, the MLD may alternatively be another device. This is not limited.

For ease of understanding, the following briefly describes terms or concepts used in the embodiments of this application.

A sending device sends a physical layer protocol data unit (PHY protocol data unit, PPDU) carrying a trigger (trigger) frame to a receiving device. After receiving the PPDU carrying the trigger frame, the receiving device sends uplink data by using a trigger-based physical layer protocol data unit (trigger-based PHY protocol data unit, TB PPDU) after a short interframe space (short interframe space, SIFS) time (which may also be denoted as aSIFSTime). Before returning the TB PPDU, the receiving device needs to detect, in an energy detection manner within the SIFS time before sending the TB PPDU, whether a channel is in an idle state. If the channel is in an idle state, the receiving device sends the TB PPDU. If the channel is in a busy state, the receiving device does not send the TB PPDU. For example, the sending device and the receiving device may be MLDs. When the sending device sends a PPDU that does not carry a trigger frame, the receiving device does not need to perform carrier sensing before returning a BA.

The SIFS time includes three parts: D1, M1, and Rx/Tx. For example, the SIFS time is 16 microseconds. D1 is a physical layer processing delay, and D1 may also be denoted as aRxPHYDelay. M1 is a MAC layer processing delay, and M1 may also be denoted as aMACProcessingDelay. Rx/Tx is a transition time from a receiving state to a sending state, and may also be denoted as aRxTxTurnaroundTime. The three time periods are related to specific implementations, and duration of the three time periods is not determined. Within D1 and M1 time periods, the receiving device is in a receiving state, and energy sensing may be performed simultaneously when signal processing is performed at a physical layer and a MAC layer. Energy sensing is usually performed by an independent circuit, and energy measurement can be performed throughout the receiving process. In an implementation, for Rx/Tx, a time period of several hundred nanoseconds to 2 microseconds is usually required, and the receiving device cannot perform energy sensing within the Rx/Tx time period. Energy sensing usually requires a measurement result within 4 microseconds. Then measurement is continuously performed, and a measurement result is fed back to the MAC layer, to be used to determine a busy/an idle state of the channel.

For a case in which the sending device sends the PPDU carrying the trigger frame, the conventional technology cannot provide an effective solution. This application provides a communication method, to provide an alignment criterion for PPDUs sent over two links, so that the receiving device can perform energy detection within the SIFS time before returning the TB PPDU.

The following describes a communication method provided in this application with reference to FIG. 4 to FIG. 8.

Figure 4:
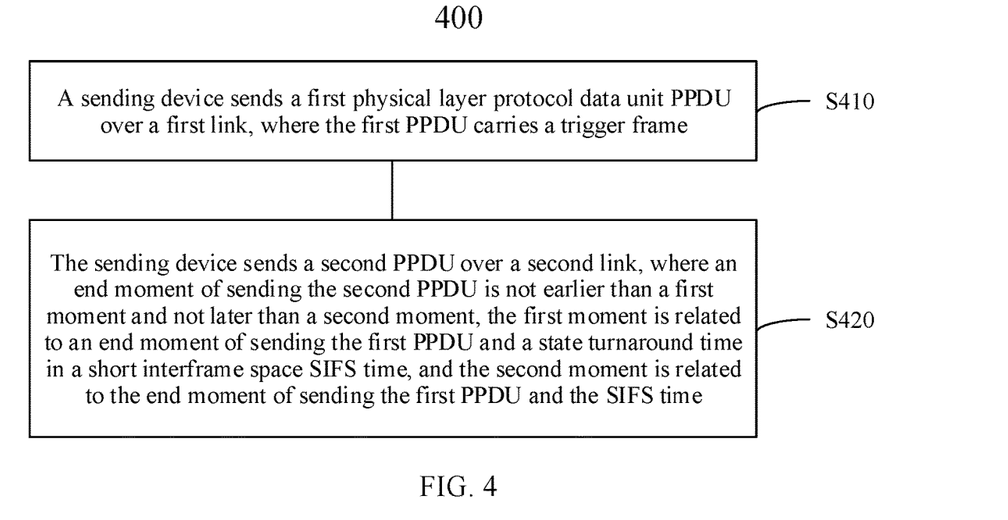
FIG. 4 is a schematic diagram of a communication method according to an embodiment of this application.

FIG. 4 is a schematic diagram of a communication method 400 according to an embodiment of this application. As shown in FIG. 4, the method 400 includes the following steps.

S410: A sending device sends a first PPDU over a first link, where the first PPDU carries a trigger frame.

For the PPDU carrying the trigger frame, after receiving the first PPDU carrying the trigger frame, the receiving device needs to perform carrier sensing (or energy detection or energy sensing) within a SIFS time, to return a TB PPDU to the sending device over the first link after the SIFS time.

S420: The sending device sends a second PPDU over a second link, where an end time of sending the second PPDU is not earlier than a first time and not later than a second time, the first time is related to an end time of sending the first PPDU and a state turnaround time in the short interframe space (SIFS time), and the second time is related to the end time of sending the first PPDU and the SIFS time.

The second PPDU does not carry a trigger frame herein. Therefore, the receiving device does not need to perform carrier sensing within the SIFS time.

For descriptions of the SIFS time, refer to the foregoing descriptions. The state turnaround time within the SIFS time is Rx/Tx described above.

The second PPDU sent by the sending device over the second link does not carry a trigger frame. To ensure that the receiving device performs carrier sensing within the SIFS time before returning the TB PPDU over the first link, the end time of sending the PPDU by the sending device over the second link needs to be constrained. The end time of sending the second PPDU cannot be earlier than the first time, and cannot be later than the second time. The first time needs to be determined based on the end time of the first PPDU and the state turnaround time within the SIFS time. In this way, it can be ensured that the receiving device can perform carrier sensing within the SIFS time before returning the TB PPDU over the first link.

Optionally, the first time satisfies the following formula: $M=T_1-T_2$; and the second time satisfies the following formula: $N=T_1+T_4$. M represents the first time, $T_1$ represents the end time of the first PPDU, $T_2$ represents the state turnaround time, N represents the second time, and $T_4$ represents the SIFS time.

Figure 5:
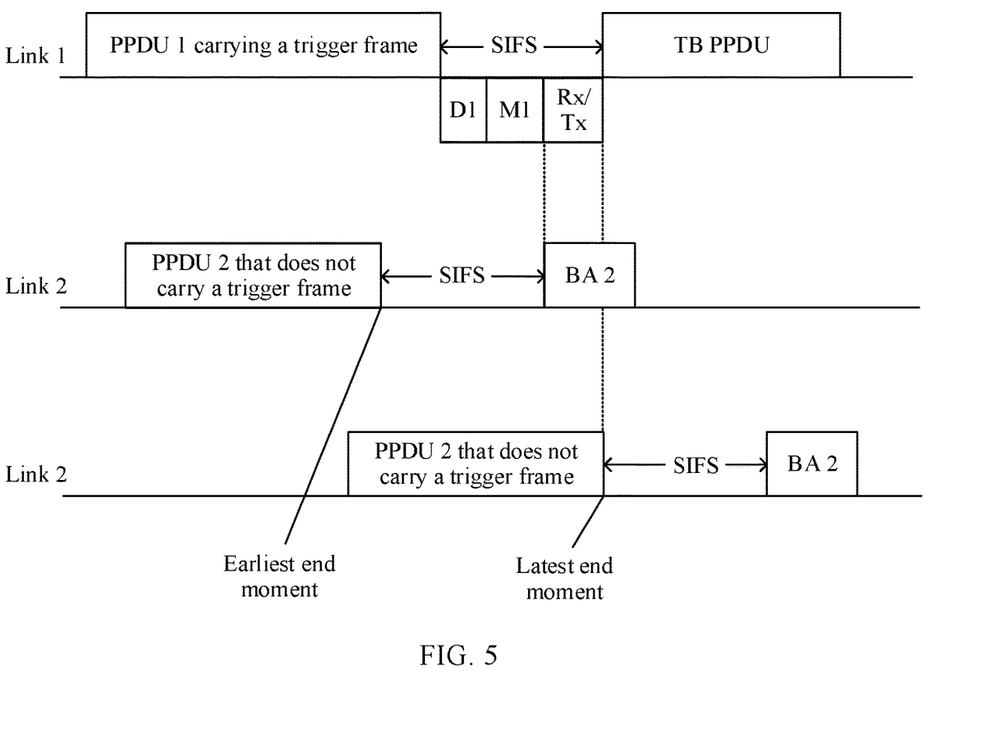
FIG. 5 is a schematic diagram of an example to which a communication method according to this application is applied.

FIG. 5 is a schematic diagram of an example to which the communication method according to this application is applied. As shown in FIG. 5, the sending device sends a PPDU 1 carrying a trigger frame over a link 1, and sends a PPDU 2 that does not carry a trigger frame over a link 2. After the SIFS time, the sending device receives a TB PPDU from the receiving device over the link 1, and receives a BA 2 from the receiving device over the link 2. FIG. 5 shows an earliest time and a latest time allowed for an end time of the PPDU 2 (namely, an earliest end time and a latest end time shown in the figure).

It can be learned from FIG. 5 that a start time of sending the BA 2 cannot be earlier than a Rx/Tx time before a TB PPDU start time on the link 1. Otherwise, energy detection of the receiving device on the link 1 will be blocked by adjacent-band interference caused by the sending of the BA over the link 2. In other words, the end time of the PPDU 2 cannot be earlier than a Rx/Tx time before an end time of sending the PPDU 1. In addition, the end time of sending the PPDU 2 by the sending device cannot be later than a SIFS time after the end time of sending the PPDU 1 over the link 1. Otherwise, the receiving device receives the PPDU 2 over the link 2 while returning the TB PPDU over the link 1. The adjacent-band signal interference caused by the TB PPDU blocks receiving of the PPDU 2 over the link 2.

Optionally, a slot time (which may be denoted as aSlotTime) factor may further be considered for the SIFS time. In other words, the SIFS time may fluctuate in consideration of a slot time. In a possible implementation, the first time may be further related to a slot time, and the second time may be further related to the slot time.

Optionally, the first time satisfies the following formula:

$M=T_1-(T_2-x \times T_3)$, or $M=T_1-\mathrm{Max}(0,T_2-x \times T_3)$.

The second time satisfies the following formula: $N=T_1+(T_4-y \times T_3)$.

M represents the first time, $T_1$ represents the end time of the first PPDU, $T_2$ represents the state turnaround time, X represents a first delay coefficient, $T_3$ represents the slot time, Max represents obtaining a maximum value, N represents the second time, $T_4$ represents the SIFS time, and y represents a second delay coefficient.

For unified description herein, a value relationship between the first delay coefficient and the second delay coefficient is not limited in this embodiment of this application. The first delay coefficient and the second delay coefficient may be the same or different. For example, both the first delay coefficient and the second delay coefficient may be 10%.

The PPDU 1 and the PPDU 2 in FIG. 5 are still used for description. When the slot time is considered, for example, if the slot time $T_3$ is aSlotTime, both x and y are 10%, the state turnaround time $T_2$ is Rx/Tx, and the SIFS time $T_4$ is SIFS, the end time of the PPDU 2 in FIG. 5 cannot be earlier than the end time of the PPDU 1 minus (Rx/Tx−10%×aSlotTime), and cannot be later than the end time of the PPDU 1 plus (SIFS−10%×aSlotTime). Because Rx/Tx is related to implementation of the receiving device, a length of Rx/Tx may be less than 10%×aSlotTime, and (Rx/Tx−10%×aSlotTime) is a negative number. In this case, the end time of the PPDU 2 may be the same as the end time of the PPDU 1. To be specific, the end time of the PPDU 2 cannot be earlier than the end time of the PPDU 1 minus Max(0, Rx/Tx−10%×aSlotTime), and cannot be later than the end time of the PPDU 1 plus (SIFS−10%×aSlotTime).

Optionally, an air propagation time (which may be denoted as aAirPropagationTime) factor may further be considered for the SIFS time. In a possible implementation, the first time may be further related to an air propagation time, and the second time may be further related to the air propagation time.

Optionally, the first time satisfies the following formula:

$M=T_1-(T_2-x \times (T_3-A))$, or
$M=T_1-\mathrm{Max}(0,T_2-x \times (T_3-A))$.

The second time satisfies the following formula: $N=T_1+(T_4-y \times (T_3-A))$.

M represents the first time, $T_1$ represents the end time of the first PPDU, $T_2$ represents the state turnaround time, $T_3$ represents the slot time, X represents the first delay coefficient, Max represents obtaining a maximum value, N represents the second time, $T_4$ represents the SIFS time, A represents the air propagation time, and y represents the second delay coefficient.

The PPDU 1 and the PPDU 2 in FIG. 5 are still used for description. When the slot time and the air propagation time are considered, for example, if the slot time $T_3$ is aSlotTime, both x and y are 10%, the air propagation time A is aAirPropagationTime, the state turnaround time $T_2$ is Rx/Tx, and the SIFS time $T_4$ is SIFS, the end time of the PPDU 2 in FIG. 5 cannot be earlier than the end time of the PPDU 1 minus (Rx/Tx−10%×(aSlotTime−aAirPropagationTime)), and cannot be later than the end time of the PPDU 1 plus (SIFS−10%×(aSlotTime−aAirPropagationTime)). Because Rx/Tx is related to implementation of the receiving device, Rx/Tx may be less than 10%×(aSlotTime−aAirPropagationTime), and (Rx/Tx−10%×(aSlotTime−aAirPropagationTime)) is a negative number. In this case, the end time of the PPDU 2 may be the same as the end time of the PPDU 1. To be specific, the end time of the PPDU 2 cannot be earlier than the end time of the PPDU 1 minus Max(0, Rx/Tx−10%×(aSlotTime−aAirPropagationTime)), and cannot be later than the end time of the PPDU 1 plus (SIFS−10%×(aSlotTime−aAirPropagationTime)).

It may be understood that a specific value of the air propagation time is not limited in this application. Generally, a coverage radius of a basic service set (basic service set, BSS) in Wi-Fi is less than 100 meters, and an air propagation time corresponding to a distance of 100 meters is 0.33 microseconds. For example, based on this, aAirPropagationTime may be set to 0.33 microseconds in a standard.

In this embodiment of this application, the state turnaround time may be reported by the receiving device to the sending device, or may be defined in a protocol. This is not limited.

Optionally, the method 400 further includes: The sending device receives the state turnaround time from the receiving device. The state turnaround time is related to the receiving device. For example, the receiving device adds the state turnaround time Rx/Tx of the receiving device to an association request frame or an association response frame and sends the association request frame or the association response frame to the sending device, so that the sending device learns of the state turnaround time Rx/Tx.

For example, for the state turnaround time defined in the protocol, the state turnaround time may be a typical implementation value, or may be a value negotiated by all chip vendors, or may be a value selected by voting in the standard.

For the receiving device, if the state turnaround time is defined as Rx/Tx0 in the protocol, the receiving device may select Rx/Tx of the receiving device with reference to Rx/Tx0. There may be different implementations of how the receiving device selects Rx/Tx.

Implementation 1: A Rx/Tx value selected by the receiving device is greater than or equal to a Rx/Tx0 value.

Figure 6:
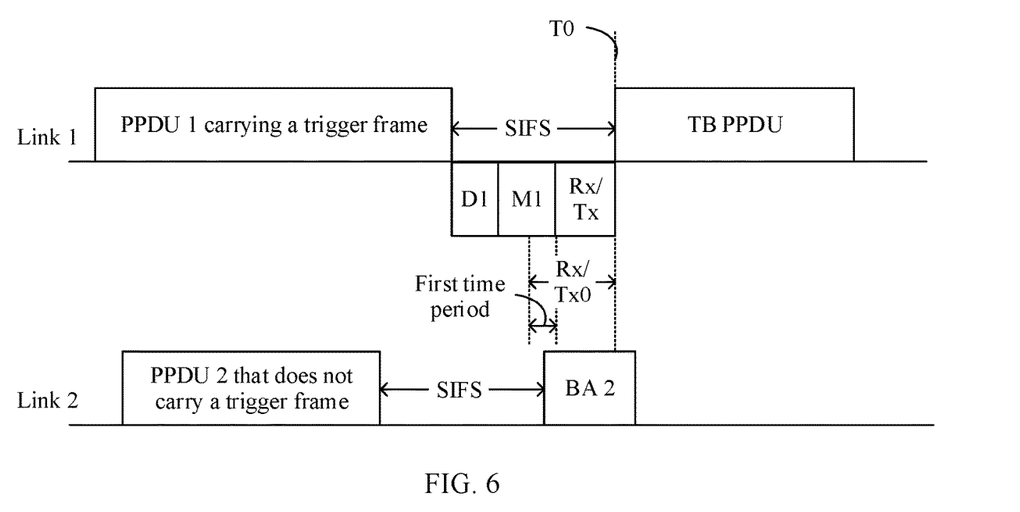
FIG. 6 is a schematic diagram of another example to which a communication method according to this application is applied.

A reason why the receiving device selects the Rx/Tx value greater than or equal to the Rx/Tx0 value is described herein by using an example in FIG. 6. As shown in FIG. 6, the sending device sends a PPDU 1 carrying a trigger frame over a link 1, and sends a PPDU 2 that does not carry a trigger frame over the link 2. After the SIFS time, the receiving device needs to return a TB PPDU over the link 1 and returns a BA 2 over the link 2. Herein, the Rx/Tx value selected by the receiving device needs to be greater than or equal to the Rx/Tx0 value. If the Rx/Tx value selected by the receiving device is less than Rx/Tx0, within a first time period, adjacent-band signal leakage caused by the BA 2 blocks energy detection on the link 1. Consequently, a channel becomes busy. In FIG. 6, the first time period is denoted as [T0−Rx/Tx0, T0−Rx/Tx]. T0 is a predetermined start time of sending the TB PPDU, or T0 is the end time of the first PPDU (for example, the PPDU 1 in FIG. 6) plus the SIFS time.

Implementation 2: The Rx/Tx value selected by the receiving device is less than the Rx/Tx0 value.

In the implementation 2, the receiving device may determine, by using an energy detection threshold, whether to send the TB PPDU. When the Rx/Tx value is less than the Rx/Tx0 value, the receiving device subtracts an adjacent-band energy leakage amount from an energy detection result, to determine a channel state of the first time period. For example, if in the first time period, a value obtained by subtracting the adjacent-band energy leakage amount from the energy detection result is greater than the energy detection threshold, it is determined that the channel is busy. If in the first time period, a value obtained by subtracting the adjacent-band energy leakage amount from the energy detection result is less than or equal to the energy detection threshold, it is determined that the channel is idle. A manner of obtaining the adjacent-band energy leakage amount is not limited in this application. For example, the adjacent-band energy leakage amount may be obtained through channel training.

It may be understood that the foregoing implementation in which the energy detection threshold is introduced to determine whether to send the TB PPDU is merely example descriptions, and does not constitute a limitation on the protection scope of the embodiments of this application. A person skilled in the art can obtain various implementations related to the energy detection threshold based on the foregoing implementations.

Alternatively, in the implementation 2, the receiving device may ignore an energy detection result within the first time period. To be specific, even if the energy detection result on the link 1 is that the channel is busy within the first time period, the receiving device may send the TB PPDU over the first link (for example, the link 1 in FIG. 6).

In a possible implementation, if the state turnaround time defined in the protocol is used, in other words, a value is fixed as Rx/Tx0, a slot time (aSlotTime) factor may also be taken into calculation of the Rx/Tx0 value. In other words, the slot time factor has been considered for selection of the fixed value Rx/Tx0. Correspondingly, the first time satisfies the following formula: $M=T_1-T_5$. The second time satisfies the following formula: $N=T_1+(T_4-y\times T_3)$.

M represents the first time, $T_1$ represents the end time of the first PPDU, $T_5$ represents the state turnaround time defined in the protocol, N represents the second time, $T_4$ represents the SIFS time, y represents the second delay coefficient, and $T_3$ represents the slot time. The $T_3$ factor has been considered for the selection of $T_5$.

The PPDU 1 and the PPDU 2 in FIG. 5 are still used for description. When the slot time is considered, for example, if the slot time $T_3$ is aSlotTime, y is 10%, the state turnaround time $T_5$ defined in the protocol is Rx/Tx0, and the SIFS time $T_4$ is SIFS, the end time of the PPDU 2 in FIG. 5 cannot be earlier than the end time of the PPDU 1 minus Rx/Tx0, and cannot be later than the end time of the PPDU 1 plus (SIFS−10%×aSlotTime).

Optionally, if the state turnaround time defined in the protocol is used, an air propagation time (aAirPropagationTime) factor may also be taken into calculation of the Rx/Tx0 value. In other words, the slot time factor and the air propagation time factor have been considered for selection of the fixed value Rx/Tx0.

Correspondingly, the first time satisfies the following formula: $M=T_1-T_5$. The second time satisfies the following formula: $N=T_1+(T_4-y\times(T_3-A))$.

M represents the first time, $T_1$ represents the end time of the first PPDU, $T_5$ represents the state turnaround time defined in the protocol, N represents the second time, $T_4$ represents the SIFS time, y represents the second delay coefficient, $T_3$ represents the slot time, and A represents the air propagation time. The $T_3$ factor and the A factor have been considered for the selection of $T_5$.

The PPDU 1 and the PPDU 2 in FIG. 5 are still used for description. When the slot time and the air propagation time are considered, for example, if the slot time $T_3$ is aSlotTime, y is 10%, the air propagation time A is aAirPropagationTime, the state turnaround time $T_5$ defined in the protocol is Rx/Tx0, and the SIFS time $T_4$ is SIFS, the end time of the PPDU 2 in FIG. 5 cannot be earlier than the end time of the PPDU 1 minus Rx/Tx0, and cannot be later than the end time of the PPDU 1 plus (SIFS−10%×(aSlotTime−aAirPropagationTime)).

It may be understood that, in this embodiment of this application, two links, the first link and the second link, are used as an example for description, but this does not constitute a limitation on this embodiment of this application. There may be multiple links between the sending device and the receiving device. When there are multiple links, this embodiment of this application is still applicable. In other words, if a receiving device is STR constrained on any two of the multiple links, and a TB PPDU is triggered on only one link, the communication method in this embodiment of this application is applicable.

It should be noted that a sending sequence of the first PPDU and the second PPDU is not limited in this embodiment of this application. The first PPDU may be sent first, or the second PPDU may be sent first. Regardless of which PPDU is sent first, an end time of the PPDU that is sent first may be used to constrain an end time of the PPDU that is sent later.

For example, if the first PPDU is sent before the second PPDU, the end time of the second PPDU is not earlier than the first time and not later than the second time. For descriptions of the first time and the second time, refer to the foregoing descriptions. For example, in the example in FIG. 5, the PPDU 1 is sent before the PPDU 2. In this case, the end time of the PPDU 2 is constrained by using the end time of the PPDU 1.

For example, if the second PPDU is sent before the first PPDU, the end time of the first PPDU is not earlier than a third time and not later than a fourth time. For a determining principle of the third time, refer to the description of the first time. For a determining principle of the fourth time, refer to the description of the second time.

The foregoing describes a communication method in a scenario in which a TB PPDU is triggered on only one link of two STR-constrained links, and the following describes a communication method in a scenario in which a TB PPDU is triggered on each of two STR-constrained links.

Figure 7:
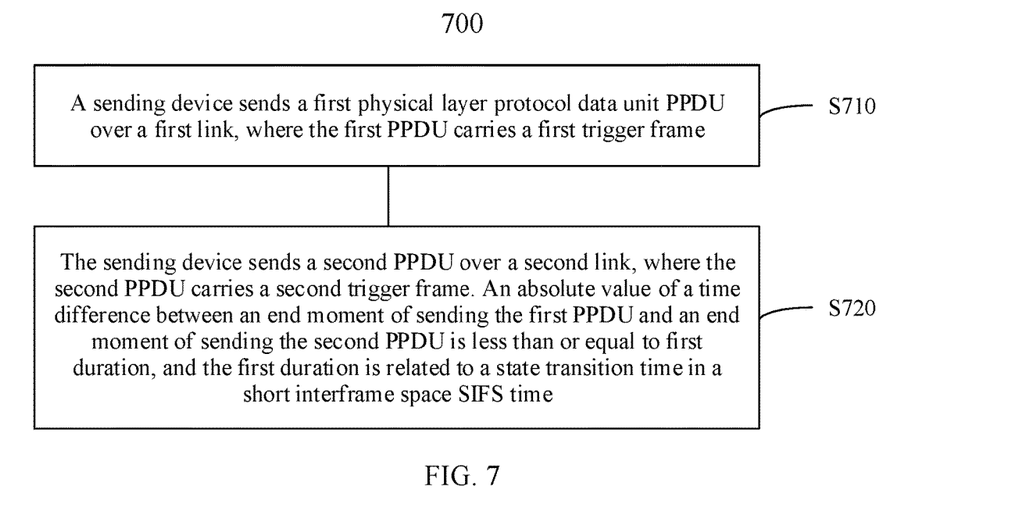
FIG. 7 is a schematic diagram of another communication method according to an embodiment of this application.

FIG. 7 is a schematic flowchart of a communication method 700 according to another embodiment of this application. As shown in FIG. 7, the method 700 includes the following steps.

S710: A sending device sends a first PPDU over a first link, where the first PPDU carries a first trigger frame.

For the first PPDU carrying the first trigger frame, after receiving the first PPDU carrying the trigger frame, the receiving device needs to perform carrier sensing (or energy detection or energy sensing) within a SIFS time, to return a TB PPDU for the first PPDU to the sending device over the first link after the SIFS time.

S720: The sending device sends a second PPDU over a second link, where the second PPDU carries a second trigger frame, an absolute value of a time difference between an end time of sending the first PPDU and an end time of sending the second PPDU is less than or equal to first duration, and the first duration is related to a state turnaround time in the short interframe space SIFS time.

For the second PPDU carrying the second trigger frame, after receiving the second PPDU carrying the trigger frame, the receiving device needs to perform carrier sensing (or energy detection or energy sensing) within the SIFS time, to return a TB PPDU for the second PPDU to the sending device over the second link after the SIFS time.

For descriptions of the SIFS time, refer to the foregoing descriptions. The state turnaround time within the SIFS time is Rx/Tx described above.

Herein, the PPDUs sent by the sending device over the first link and the second link each carry a trigger frame. To ensure that the receiving device can perform carrier sensing within the SIFS time before returning the TB PPDUs over the two links, the time difference between the end times of sending the PPDUs by the sending device over the two links needs to be constrained. The absolute value of the time difference between the end time of sending the first PPDU and the end time of sending the second PPDU is less than or equal to the first duration, and the first duration is related to the state turnaround time in the short interframe space SIFS time. In this way, it can be ensured that the receiving device can perform carrier sensing within the SIFS time before returning the TB PPDUs.

Optionally, the first duration satisfies the following formula: $L=T_2$, where L represents the first duration, and $T_2$ represents the state turnaround time. Specifically, if a value of the state turnaround time $T_2$ is Rx/Tx, the absolute value of the time difference between the end time of sending the first PPDU and the end time of sending the second PPDU is less than or equal to the state turnaround time Rx/Tx. If a value of the state turnaround time $T_2$ is a fixed value defined in a protocol, for example, Rx/Tx0, the absolute value of the time difference between the end time of sending the first PPDU and the end time of sending the second PPDU is less than or equal to the state turnaround time Rx/Tx0.

Figure 8:
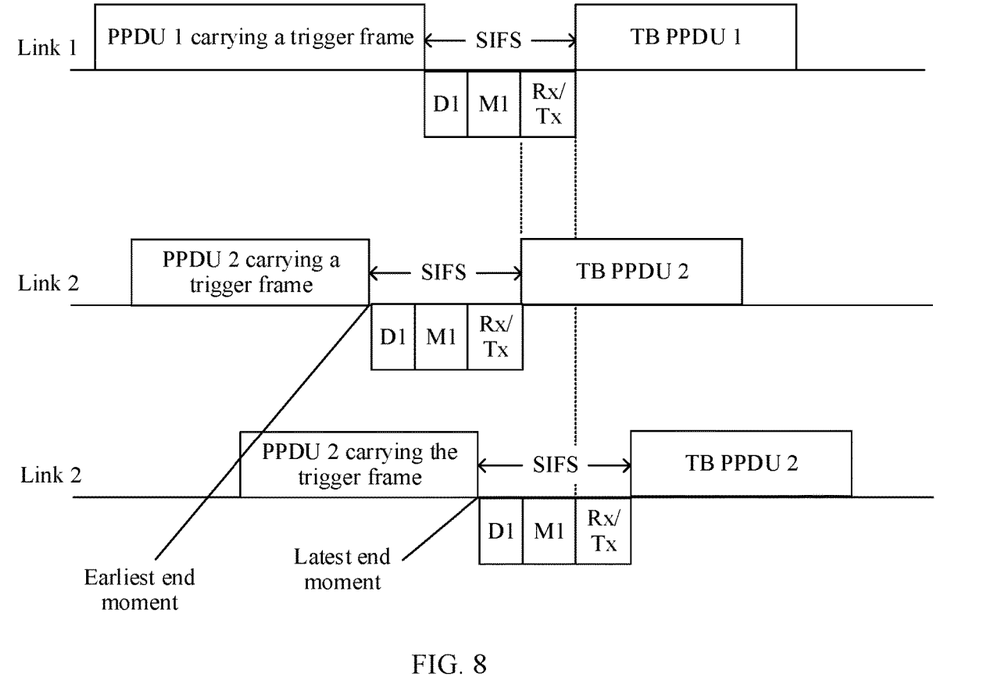
FIG. 8 is a schematic diagram of an example to which another communication method according to this application is applied.

FIG. 8 is a schematic diagram of an example to which another communication method according to this application is applied. As shown in FIG. 8, the sending device sends a PPDU 1 carrying a trigger frame over a link 1, and sends a PPDU 2 carrying a trigger frame over a link 2. After the SIFS time, the sending device receives a TB PPDU 1 from the receiving device over the link 1, and receives a TB PPDU 2 from the receiving device over the link 2. FIG. 8 shows allowable duration of an absolute value of a time difference between an end time of the PPDU 1 and an end time of the PPDU 2.

FIG. 8 shows an earliest end time and a latest end time of the PPDU 2. It can be learned from FIG. 8 that the time difference between the end time of the PPDU 1 and the end time of the PPDU 2 cannot exceed Rx/Tx. Optionally, if state turnaround time is Rx/Tx0 defined in the protocol, the time difference between the end time of the PPDU 1 and the end time of the PPDU 2 cannot exceed Rx/Tx0.

Similar to the method 400, optionally, a slot time (aSlot-Time) factor may further be considered for the SIFS time. In a possible implementation, the first duration may be further related to a slot time.

Optionally, the first duration satisfies the following formula: $L=T_2-x \times T_3$, or $L=Max(0, T_2-x \times T_3)$.

L represents the first duration, $T_2$ represents the state turnaround time, X represents a first delay coefficient, $T_3$ represents the slot time, and Max represents obtaining a maximum value.

The PPDU 1 and the PPDU 2 in FIG. 8 are still used for description. When the slot time is considered, for example, if the slot time $T_3$ is aSlotTime, X is 10%, and the state turnaround time $T_2$ is Rx/Tx, the time difference between the end time of the PPDU 1 and the end time of the PPDU 2 in FIG. 8 cannot exceed (Rx/Tx−10%×aSlotTime), or cannot exceed Max(0, Rx/Tx−10%×aSlotTime). It may be understood that herein, if the state turnaround time $T_2$ is Rx/Tx0 defined in the protocol, Rx/Tx in the condition that the time difference between the end time of the PPDU 1 and the end time of the PPDU 2 satisfies is replaced with Rx/Tx0.

Similar to the method 400, optionally, an air propagation time (aAirPropagationTime) factor may further be considered for the SIFS time. In a possible implementation, the first duration is further related to an air propagation time.

Optionally, the first duration satisfies the following formula: $L=T_2-x \times (T_3-A)$, or $L=Max(0, T_2-x \times (T_3-A))$.

L represents the first duration, $T_2$ represents the state turnaround time, X represents the first delay coefficient, $T_3$ represents the slot time, A represents the air propagation time, and Aar represents obtaining a maximum value.

The PPDU 1 and the PPDU 2 in FIG. 8 are still used for description. When the slot time and the air propagation time are considered, for example, if the slot time $T_3$ is aSlotTime, X is 10%, the state turnaround time $T_2$ is Rx/Tx, and the air propagation time A is aAirPropagationTime, the time difference between the end time of the PPDU 1 and the end time of the PPDU 2 in FIG. 8 cannot exceed (Rx/Tx−10%× (aSlotTime−aAirPropagationTime)), or cannot exceed Max (0, Rx/Tx−10%×(aSlotTime−aAirPropagationTime)). It may be understood that herein, if the state turnaround time $T_2$ is Rx/Tx0 defined in the protocol, Rx/Tx in the condition that the time difference between the end time of the PPDU 1 and the end time of the PPDU 2 satisfies is replaced with Rx/Tx0.

It may be understood that the examples in FIG. 5, FIG. 6, and FIG. 8 are provided merely to help a person skilled in the art understand the embodiments of this application, instead of limiting the embodiments of this application to specific scenarios shown in the examples. A person skilled in the art can make various equivalent modifications or changes according to the examples shown in FIG. 5, FIG. 6, and FIG. 8, and such modifications or changes also fall within the scope of the embodiments of this application. It may further be understood that, in this embodiment of this application, two links, the first link and the second link, are used as an example for description, but this does not constitute a limitation on this embodiment of this application. There may be multiple links between the sending device and the receiving device. When there are multiple links, this embodiment of this application is still applicable. In other words, if a receiving device is STR constrained on any two of the multiple links, and a TB PPDU is triggered on each of the two links, the communication method in this embodiment of this application is applicable to the two links.

It may further be understood that, in some scenarios, some optional features in the embodiments of this application may be independently implemented without depending on another feature, for example, a solution on which the optional features are currently based, to resolve a corresponding technical problem and achieve a corresponding effect. Alternatively, in some scenarios, the optional features are combined with other features based on requirements. Correspondingly, an apparatus provided in the embodiments of this application may also correspondingly implement these features or functions. Details are not described herein.

It may be understood that the solutions in the embodiments of this application may be properly combined for use, and explanations or descriptions of terms in the embodiments may be cross-referenced or explained in the embodiments. This is not limited.

It may further be understood that sequence numbers of the foregoing processes do not mean execution sequences in various embodiments of this application. The execution sequences of the processes should be determined based on functions and internal logic of the processes. Numbers or sequence numbers in the foregoing processes are merely used for differentiation for ease of description, and should not constitute any limitation on an implementation process of the embodiments of this application.

Corresponding to the methods provided in the foregoing method embodiments, an embodiment of this application further provides a corresponding apparatus. The apparatus includes a corresponding module configured to perform the foregoing embodiments. The module may be software, hardware, or a combination of software and hardware. It should be understood that the technical features described in the method embodiments are also applicable to the following apparatus embodiments.

Figure 9:
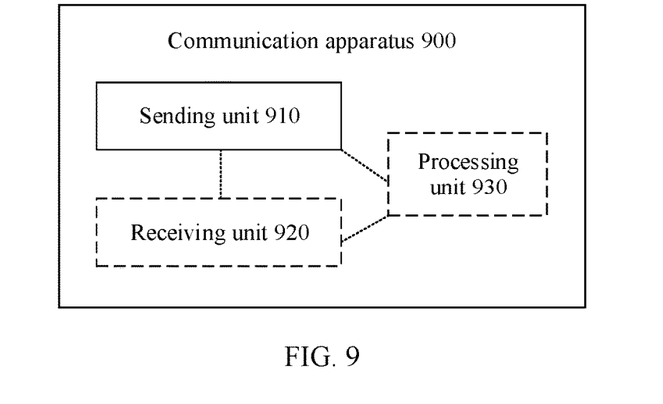
FIG. 9 is a schematic block diagram of a communication apparatus according to an embodiment of this application.

FIG. 9 is a schematic block diagram of a communication apparatus 900 according to an embodiment of this application. As shown in FIG. 9, the communication apparatus includes a sending unit 910. Optionally, the communication apparatus may further include a receiving unit 920 and a processing unit 930.

In a possible design, the communication apparatus 900 may be corresponding to the sending device in the foregoing method embodiments, for example, may be an MLD or a chip configured in the MLD.

Specifically, the communication apparatus 900 may be corresponding to the sending device in the method 400 or the method 700 in the embodiments of this application. The communication apparatus 900 may include a unit configured to perform the method performed by the sending device in the method 400 in FIG. 4 or the method 700 in FIG. 7. In addition, the units in the communication apparatus 900 and the foregoing other operations or functions are separately intended to implement corresponding procedures of the sending device in the method 400 in FIG. 4 or the method 700 in FIG. 7.

In a possible implementation, the sending unit 910 is configured to send a first physical layer protocol data unit PPDU over a first link, where the first PPDU carries a trigger frame. The sending unit 910 is further configured to send a second PPDU over a second link, where an end time of sending the second PPDU is not earlier than a first time and not later than a second time, the first time is related to an end time of sending the first PPDU and a state turnaround time in a short interframe space SIFS time, and the second time is related to the end time of sending the first PPDU and the SIFS time.

Optionally, the first time satisfies the following formula: $M=T_1-T_2$; and the second time satisfies the following formula: $N=T_1+T_4$. M represents the first time, $T_1$ represents the end time of the first PPDU, $T_2$ represents the state turnaround time, N represents the second time, and $T_4$ represents the SIFS time.

Optionally, the first time is further related to a slot time, and the second time is further related to the slot time.

Optionally, the first time satisfies the following formula: $M=T_1-(T_2-x\times T_3)$ or $M=T_1-\text{Max}(0,T_2-x\times T_3)$; and the second time satisfies the following formula: $N=T_1+(T_4-y\times T_3)$. M represents the first time, $T_1$ represents the end time of the first PPDU, $T_2$ represents the state turnaround time, X represents a first delay coefficient, $T_3$ represents the slot time, Max represents obtaining a maximum value, N represents the second time, $T_4$ represents the SIFS time, and y represents a second delay coefficient.

Optionally, the first time is further related to an air propagation time, and the second time is further related to the air propagation time.

Optionally, the first time satisfies the following formula: $M=T_1-(T_2-x\times(T_3-A))$ or $M=T_1-\text{Max}(0,T_2-x\times(T_3-A))$; and the second time satisfies the following formula: $N=T_1+(T_4-y\times((T_3-A))$. M represents the first time, $T_1$ represents the end time of the first PPDU, $T_2$ represents the state turnaround time, $T_3$ represents the slot time, X represents the first delay coefficient, Max represents obtaining a maximum value, N represents the second time, $T_4$ represents the SIFS time, A represents the air propagation time, and y represents the second delay coefficient.

The apparatus further includes a receiving unit 920, configured to receive the state turnaround time from a receiving device.

In another possible implementation, the sending unit 910 is configured to send a first physical layer protocol data unit (PPDU) over a first link, where the first PPDU carries a first trigger frame. The sending unit is further configured to send a second PPDU over a second link, where the second PPDU carries a second trigger frame.

An absolute value of a time difference between an end time of sending the first PPDU and an end time of sending the second PPDU is less than or equal to first duration, and the first duration is related to a state turnaround time in a short interframe space (SIFS) time.

Optionally, the first duration satisfies the following formula: $L=T_2$, where L represents the first duration, and $T_2$ represents the state turnaround time.

Optionally, the first duration is further related to a slot time.

Optionally, the first duration satisfies the following formula: $L=T_2-x\times T_3$ or $L=\text{Max}(0,T_2-x\times T_3)$. L represents the first duration, $T_2$ represents the state turnaround time, X represents a first delay coefficient, $T_3$ represents the slot time, and Max represents obtaining a maximum value.

Optionally, the first duration is further related to an air propagation time.

Optionally, the first duration satisfies the following formula: $L=T_2-x\times(T_3-A)$, or $L=\text{Max}(0,T_2-x\times(T_3-A))$. L represents the first duration, $T_2$ represents the state turnaround time, X represents the first delay coefficient, $T_3$ represents the slot time, A represents the air propagation time, and Max represents obtaining a maximum value.

Optionally, the apparatus 900 further includes a receiving unit 920, configured to receive the state turnaround time from a receiving device.

It should be understood that, a specific process in which each unit performs the foregoing corresponding step has been described in detail in the foregoing method embodiments. For brevity, details are not described herein again.

Figure 10:
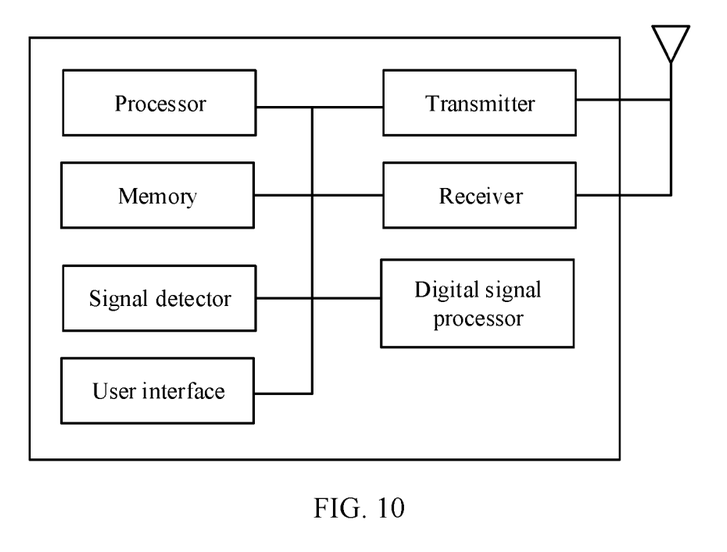
FIG. 10 is a schematic diagram of a structure of a communication apparatus according to an embodiment of this application.

It should be further understood that when the communication apparatus 900 is the communication apparatus in FIG. 10, the sending unit 910 in the communication apparatus 900 may be corresponding to the transmitter shown in FIG. 10, the receiving unit 920 may be corresponding to the receiver shown in FIG. 10, and the processing unit 930 in the communication apparatus 900 may be corresponding to the processor shown in FIG. 10.

Optionally, the communication apparatus 900 further includes a storage unit. The storage unit may be configured to store instructions or data. The processing unit may invoke the instructions or the data stored in the storage unit, to implement a corresponding operation. The storage unit may be implemented by using at least one memory, for example, may be corresponding to the memory in FIG. 10.

It should be further understood that when the communication apparatus 900 is the chip disposed in the MLD, the sending unit 910 in the communication apparatus 900 may be an output interface circuit, and the receiving unit 920 in the communication apparatus 900 may be an input interface circuit.

FIG. 10 is a schematic diagram of a structure of a communication apparatus according to an embodiment of this application. As shown in FIG. 10, the device includes a processor, a memory, a transmitter (or referred to as a transmitter machine or a transmitter circuit), a receiver (or referred to as a receiver machine or a receiver circuit), a signal detector, a user interface, and a digital signal processor. The processor, the memory, the transmitter, the receiver, the signal detector, the user interface, and the digital signal processor may communicate with each other through an internal connection path to transfer a control or data signal. The memory is configured to store a computer program, and the processor is configured to invoke the computer program from the memory and run the computer program, to control the transmitter to send a signal and/or control the receiver to receive a signal. The transmitter is configured to transmit a signal, and the receiver is configured to receive a signal. Optionally, the communication apparatus may further include an antenna, configured to send, by using a wireless signal, uplink data or uplink control signaling output by the transmitter and the receiver.

Optionally, the transmitter and the receiver may be independently deployed, or may be combined into a transceiver.

It should be understood that the communication apparatus shown in FIG. 10 can implement the method performed by the sending device or the receiving device in the embodiments of this application, for example, processes related to the sending device in the method embodiment shown in FIG. 4 or FIG. 7. Operations and/or functions of the modules in the communication apparatus are separately intended to implement corresponding procedures in the foregoing method embodiments. For details, refer to the descriptions in the foregoing method embodiments. To avoid repetition, detailed descriptions are properly omitted herein.

It should be understood that, the communication apparatus shown in FIG. 10 is merely a possible architecture of the sending device, and shall not constitute any limitation on this application.

Optionally, the communication apparatus includes but is not limited to an AP device such as a communication server, a router, a switch, or a bridge, and a non-AP device such as a mobile phone, a tablet computer, a notebook computer, a smart watch, or a smart TV.

According to the methods provided in the embodiments of this application, this application further provides a computer program product. The computer program product includes computer program code. When the computer program code is run on a computer, the computer is enabled to perform the method in the embodiment shown in FIG. 4 or FIG. 7.

According to the methods provided in the embodiments of this application, this application further provides a computer-readable storage medium. The computer-readable storage medium stores program code. When the program code is run on a computer, the computer is enabled to perform the method in the embodiment shown in FIG. 4 or FIG. 7.

An embodiment of this application further provides a processing apparatus, including a processor and an interface. The processor is configured to perform the communication method in any one of the foregoing method embodiments.

A person skilled in the art may further understand that various illustrative logical blocks (illustrative logical blocks) and steps (steps) that are listed in the embodiments of this application may be implemented by using electronic hardware, computer software, or a combination thereof. Whether the functions are implemented by using hardware or software depends on particular applications and a design requirement of the entire system. A person skilled in the art may use various methods to implement the described functions for each particular application, but it should not be considered that the implementation goes beyond the scope of the embodiments of this application.

It should be understood that the processor in the embodiments of this application may be an integrated circuit chip, and has a signal processing capability. In an implementation process, the steps in the foregoing method embodiments may be completed by using a hardware integrated logic circuit in the processor or instructions in a form of software. The processor may be a general purpose processor, a digital signal processor (digital signal processor, DSP), an application-specific integrated circuit (application-specific integrated circuit, ASIC), a field programmable gate array (field programmable gate array, FPGA) or another programmable logic device, a discrete gate, a transistor logic device, a discrete hardware component, a system on chip (system on chip, SoC), a central processing unit (central processor unit, CPU), a network processor (network processor, NP), a digital signal processor (digital signal processor, DSP), a micro controller unit (micro controller unit, MCU), a programmable logic device (programmable logic device, PLD), or another integrated chip. The processor may implement or perform the methods, the steps, and logical block diagrams that are disclosed in the embodiments of this application. The general-purpose processor may be a microprocessor, or the processor may be any conventional processor or the like. The steps of the methods disclosed with reference to the embodiments of this application may be directly performed and completed by a hardware decoding processor, or may be performed and completed by using a combination of hardware and software modules in the decoding processor. A software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor.

The technologies described in this application may be implemented in various manners. For example, these technologies may be implemented by using hardware, software, or a combination of hardware and software. For hardware implementation, a processing unit configured to perform these technologies at a communication apparatus (for example, a base station, a terminal, a network entity, or a chip) may be implemented in one or more general-purpose processors, a DSP, a digital signal processing device, an ASIC, a programmable logic device, an FPGA, or another programmable logic apparatus, a discrete gate or transistor logic, a discrete hardware component, or any combination thereof. The general-purpose processor may be a microprocessor. Optionally, the general-purpose processor may alternatively be any conventional processor, controller, microcontroller, or state machine. The processor may alternatively be implemented by a combination of computing apparatuses, such as a digital signal processor and a microprocessor, multiple microprocessors, one or more microprocessors in combination with a digital signal processor core, or any other similar configuration.

It may be understood that the memory in the embodiments of this application may be a volatile memory or a non-volatile memory, or may include both a volatile memory and a non-volatile memory. The nonvolatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM) that is used as an external cache. By way of example but not limitative description, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM). It should be noted that, the memory in the system and method described in this specification includes but is not limited to these memories and any memory of another proper type.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer instructions are loaded and executed on a computer, the procedures or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a high-dense digital video disc (digital video disc, DVD)), a semiconductor medium (for example, a solid-state drive (solid-state drive, SSD)), or the like.

It should be understood that "embodiment" mentioned in the entire specification means that particular features, structures, or characteristics related to the embodiments are included in at least one embodiment of this application. Therefore, the embodiments in the entire specification are not necessarily same embodiments. In addition, the particular features, structure, or characteristics may be combined in one or more embodiments in any proper manner. It should be understood that sequence numbers of the foregoing processes do not mean execution orders in various embodiments of this application. The execution orders of the processes should be determined based on functions and internal logic of the processes, and should not be construed as any limitation on the implementation processes of the embodiments of this application.

It should be further understood that, in this application, "when" and "if" mean that UE or a base station performs corresponding processing in an objective situation, and are not intended to limit time, and the UE or the base station is not necessarily required to have a determining action during implementation, and do not mean any other limitation.

A person of ordinary skill in the art may understand that various reference numerals such as "first" and "second" in this application are merely used for differentiation for ease of description, and are not used to limit a scope of the embodiments of this application, or represent a sequence.

In this application, unless otherwise specified, an element represented in a singular form is intended to represent "one or more", but is not intended to represent "one and only one". In this application, unless otherwise specified, "at least one" is intended to represent "one or more", and "multiple" is intended to represent "two or more".

In addition, the terms "system" and "network" may be used interchangeably in this specification. The term "and/or" in this specification describes only an association relationship for describing associated objects and represents that three relationships may exist. For example, A and/or B may represent the following three cases: only A exists, both A and B exist, and only B exists. A may be singular or plural, and B may be singular or plural.

The character "/" generally indicates an "or" relationship between the associated objects.

The term "at least one of" in this specification indicates all or any combination of listed items. For example, "at least one of A, B, and C" may indicate the following six cases: A exists alone, B exists alone, C exists alone, A and B coexist, B and C coexist, and A, B, and C coexist. A may be singular or plural, B may be singular or plural, and C may be singular or plural.

It should be understood that in the embodiments of this application, "B corresponding to A" indicates that B is associated with A, and B may be determined based on A. However, it should further be understood that determining A according to B does not mean that B is determined according to A only; that is, B may also be determined according to A and/or other information.

A person of ordinary skill in the art may be aware that, in combination with units and algorithm steps in the examples described in the embodiments disclosed in this specification, the embodiments may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in another manner. For example, the described apparatus embodiment is merely an example. For example, division into units is merely logical function division and may be other division during actual implementation. For example, multiple units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in an electrical form, a mechanical form, or another form.

The units described as separate parts may or may not be physically separate, and parts displayed as units may or may not be physical units, and may be located in one position, or may be distributed on multiple network units. Some or all of the units may be selected based on actual requirements to achieve the objectives of the solutions of the embodiments.

In addition, functional units in the embodiments of this application may be integrated into one processing unit, or each of the units may exist alone physically, or two or more units may be integrated into one unit.

When the functions are implemented in the form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes any medium that can store program code, such as a USB flash drive, a removable hard disk, a read-only memory (read-only memory, ROM), a random access memory (random access memory, RAM), a magnetic disk, or a compact disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method, comprising:
   sending, by a sending device, a first physical layer protocol data unit (PPDU) over a first link, wherein the first PPDU carries a trigger frame; and sending, by the sending device, a second PPDU over a second link, wherein an end time of sending the second PPDU is not earlier than a first time and not later than a second time, the first time is related to an end time of sending the first PPDU and a state turnaround time, and the second time is related to the end time of sending the first PPDU and a short interframe space (SIFS) time.

2. The method according to claim 1, wherein the first time satisfies the following formula: $M=T_1-T_2$; wherein M represents the first time, $T_1$ represents the end time of the first PPDU, $T_2$ represents the state turnaround time.

3. The method according to claim 1, wherein the second time satisfies the following:
the second time equals to the end time of the first PPDU plus a value, wherein the value is greater than 0 and less than the SIFS time.

4. The method according to claim 3, wherein
the second time satisfies the following formula: $N=T_1+(T_4-y\times T_3)$, wherein
N represents the second time, $T_1$ represents the end time of the first PPDU, $T_4$ represents the SIFS time, Y represents a second delay coefficient, and $T_3$ represents a slot time.

5. The method according to claim 1, wherein the state turnaround time is an aRxTxTurnaroundTime.

6. A communication method, comprising:
receiving, by a receiving device, a first physical layer protocol data unit (PPDU) over a first link, where the first PPDU carries a trigger frame; and
receiving, by the receiving device, a second PPDU over a second link, wherein an end time of the second PPDU is not earlier than a first time and not later than a second time, the first time is related to an end time of the first PPDU and a state turnaround time, and the second time is related to the end time of the first PPDU and a short interframe space (SIFS) time.

7. The method according to claim 6, wherein the first time satisfies the following formula: $M=T_1-T_2$; wherein M represents the first time, $T_1$ represents the end time of the first PPDU, $T_2$ represents the state turnaround time.

8. The method according to claim 6, wherein the second time satisfies the following:
the second time equals to the end time of the first PPDU plus a value, wherein the value is greater than 0 and less than the SIFS time.

9. The method according to claim 8, wherein the second time satisfies the following formula: $N=T_1+(T_4-y\times T_3)$, wherein N represents the second time, $T_1$ represents the end time of the first PPDU, $T_4$ represents the SIFS time, Y represents a second delay coefficient, and $T_3$ represents a slot time.

10. The method according to claim 6, wherein the state turnaround time is an aRxTxTurnaroundTime.

11. A sending device, comprising:
at least one processor; and
one or more memories coupled to the at least one processor and storing programming instructions for execution by the at least one processor to cause the device to perform following operations:
sending a first physical layer protocol data unit (PPDU) over a first link, wherein the first PPDU carries a trigger frame; and
sending a second PPDU over a second link, wherein an end time of sending the second PPDU is not earlier than a first time and not later than a second time, the first time is related to an end time of sending the first PPDU and a state turnaround time, and the second time is related to the end time of sending the first PPDU and a short interframe space (SIFS) time.

12. The sending device according to claim 11, wherein the first time satisfies the following formula: $M=T_1-T_2$; wherein M represents the first time, $T_1$ represents the end time of the first PPDU, $T_2$ represents the state turnaround time.

13. The sending device according to claim 11, wherein the second time satisfies the following:
the second time equals to the end time of the first PPDU plus a value, wherein the value is greater than 0 and less than the SIFS time.

14. The sending device according to claim 13, wherein the second time satisfies the following formula: $N=T_1+(T_4-y\times T_3)$, wherein N represents the second time, $T_1$ represents the end time of the first PPDU, $T_4$ represents the SIFS time, Y represents a second delay coefficient, and $T_3$ represents a slot time.

15. The sending device according to claim 11, wherein the state turnaround time is an aRxTxTurnaroundTime.

16. A receiving device, comprising:
at least one processor; and
one or more memories coupled to the at least one processor and storing programming instructions for execution by the at least one processor to cause the device to perform following operations:
receiving a first physical layer protocol data unit (PPDU) over a first link, where the first PPDU carries a trigger frame; and
receiving a second PPDU over a second link, wherein an end time of the second PPDU is not earlier than a first time and not later than a second time, the first time is related to an end time of the first PPDU and a state turnaround time, and the second time is related to the end time of the first PPDU and a short interframe space (SIFS) time.

17. The receiving device according to claim 16, wherein the first time satisfies the following formula: $M=T_1-T_2$; wherein M represents the first time, $T_1$ represents the end time of the first PPDU, $T_2$ represents the state turnaround time.

18. The receiving device according to claim 16, wherein the second time satisfies the following:
the second time equals to the end time of the first PPDU plus a value, wherein the value is greater than 0 and less than the SIFS time.

19. The receiving device according to claim 18, wherein the second time satisfies the following formula: $N=T_1+(T_4-y\times T_3)$, wherein N represents the second time, $T_1$ represents the end time of the first PPDU, $T_4$ represents the SIFS time, Y represents a second delay coefficient, and $T_3$ represents a slot time.

20. The receiving device according to claim 16, wherein the state turnaround time is an aRxTxTurnaroundTime.

* * * * *